United States Patent [19]
El-Batal

[11] Patent Number: 6,085,332
[45] Date of Patent: Jul. 4, 2000

[54] RESET DESIGN FOR REDUNDANT RAID CONTROLLERS

[75] Inventor: Mohamad H. El-Batal, Westminster, Colo.

[73] Assignee: Mylex Corporation, Fremont, Calif.

[21] Appl. No.: 09/130,965

[22] Filed: Aug. 7, 1998

[51] Int. Cl.[7] ....................................................... G06F 3/00
[52] U.S. Cl. .................... 714/5; 710/1; 711/114
[58] Field of Search .................. 710/1–19; 714/1–9, 714/23, 55; 711/100–114, 166

[56] References Cited

U.S. PATENT DOCUMENTS

| | | | |
|---|---|---|---|
| 4,803,682 | 2/1989 | Hara et al. .................................. | 714/23 |
| 4,811,200 | 3/1989 | Wagner et al. ............................. | 714/47 |
| 4,894,828 | 1/1990 | Novy et al. ................................. | 714/11 |
| 5,155,846 | 10/1992 | Mino .......................................... | 714/55 |
| 5,321,830 | 6/1994 | Nakamura et al. ........................ | 714/23 |
| 5,333,285 | 7/1994 | Drerup ....................................... | 714/23 |
| 5,367,669 | 11/1994 | Holland et al. ............................. | 714/7 |
| 5,530,946 | 6/1996 | Bouvier et al. ............................ | 714/23 |
| 5,583,987 | 12/1996 | Kobayashi et al. ........................ | 714/13 |
| 5,611,078 | 3/1997 | Miller et al. ............................... | 713/100 |
| 5,636,341 | 6/1997 | Matsushita et al. ....................... | 714/13 |
| 5,717,907 | 2/1998 | Kuddes et al. ............................ | 713/500 |
| 5,748,873 | 5/1998 | Ohguro et al. ............................. | 714/11 |

*Primary Examiner*—Ayaz R. Sheikh
*Assistant Examiner*—Sumati Lefkowitz
*Attorney, Agent, or Firm*—Flehr Hohbach Test Albritton & Herbert LLP

[57] ABSTRACT

A reset circuit implemented in a RAID controller configured for dual active operation. The reset circuit generates a reset pulse with a relatively invariant pulse width that is coupled to the controller's main CPU and I/O processors. The reset pulse can be generated in response to activation of an external common reset signal. The external common reset signal is activated by an external system (e.g., another controller configured for dual active operation) whenever the controller needs to be reset. This can be when the controller fails to maintain a communication signal transmitted to the external system or when the external system has inconsistent configuration information, requiring the entire system (i.e., both the controller and the external system) to be re-initialized. The reset pulse can also be generated in response to internal reset instructions issued by the controller's main CPU. The reset instructions can be issued whenever the first controller determines that its own configuration information is inconsistent. As a result of the reset instruction being issued the external common reset signal is activated as an output to reset the external system (i.e., the external common reset signal is bidirectional). The self-reset operation can be over-ridden by a reset disable instruction.

20 Claims, 5 Drawing Sheets

RESET DESIGN FOR REDUNDANT RAID CONTROLLERS

The present invention relates generally to redundant controllers and, particularly, to redundant controllers for RAID systems.

BACKGROUND OF THE INVENTION

Basic RAID storage systems include an array of redundant disks and a controller that enables a server transparently to perform I/O to the array. A RAID system greatly improves storage system reliability as data can be stored on multiple disks within the array. A RAID system also reduces the cost of storage as the small disks composing the array are relatively inexpensive.

An improved RAID storage system includes dual controllers, each configured to access the same array of disks. The dual controllers improve access to the array because the controllers can simultaneously serve I/O requests from two servers. Moreover, a dual controller (duplex) system can offer even greater reliability than a single controller (simplex) system if each dual controller is configured to handle all I/O requests in the case the other fails. This capability is called "transparent failover." Operation of one dual controller system is now described in reference to FIG. 1.

FIG. 1 shows a block diagram of a dual controller system 100 that includes two controllers 104-1, 104-2 and a disk array 106. The two controllers 104-1, 104-2 are coupled via a host bus 103 to one or more servers 102A, 102B. This configuration is common to prior art dual controller systems (e.g., the Mylex DAC960SX) and dual controller systems in which the present invention is implemented (e.g., the Mylex DAC960SF). The two controllers 104-1, 104-2 are coupled to the disk array 106 by a high speed bus 105. In the case of the DAC960SX both busses 103, 105 are SCSI busses and each controller 104 has its own SCSI ID. The controllers 104-1, 104-2 can operate in duplex mode (as a redundant pair of controllers) or in simplex mode (as independent controllers). When operating in duplex mode the controllers 104 communicate with each other using a communication signal 110 and a common reset signal (RSTCOM*) 112.

When configured as a redundant pair, both controllers 104 have access to the same disk drives 108 and both process host I/O. The communication signal 110 between the controllers keep each informed that the other controller is operating normally. If the communication signal 110 is interrupted, the controller 104 that detects the interruption asserts the reset signal 112 to the other controller 104 (holding the failed controller in a hard reset) and starts processing I/O for both controllers 104. This "Fail Over" is transparent to the host computers 102 because the surviving controller 104 can respond to multiple target IDs on the host SCSI bus 103. Interruption of the communication signal 110 can result from a controller 104 being removed from the system or the controller 104 experiencing a fault that causes it to lock-up when some abnormal operation occurs.

When the failed controller 104 is replaced, the surviving controller 104 releases the reset signal 112 and allows the new controller to start. Once running, the new controller 104 establishes the communication signal 110 and determines the system (i.e., array 106) configuration using COD (Configuration On Disk) stored on the array 106. The new controller permanently stores the system configuration in on-board, non-volatile, random access memory (NAVAM. The surviving controller then initiates a "Fail Back" sequence to hand over the I/O processing to the new controller. Following the Fail Back sequence the system is back to Active/Active operation in which both controllers 104 actively handle I/O requests.

At power up, each of the two controllers 104 verifies their own NVRAM-stored configuration versus the disk configuration stored on the disk array 106. If a controller 104 detects a discrepancy, that controller saves the disk configuration onto its NVRAM, hard resets both itself and its partner (via assertion of the common reset signal 112) and then comes back up with the correct NVRAM configuration.

A hard reset operation places a controller in a clean state by resetting the controller's main CPU and its I/O processors (the I/O processors implement the various communication protocols used by the controller to communicate with hosts 102 and the disk array 106.) In the DCA960SX, the hard reset operation is implemented by reset circuitry within the controller 104 that activates a reset pulse coupled to the controller's main CPU and I/O processors. (The reset pulse is not shown in FIG. 1 as it is an internal signal). It is important that the reset pulse remain active long enough to allow the CPU and the I/O processors to be completely reset.

The DCA960SX reset circuitry accomplishes this goal by delaying the active to inactive transition of the reset pulse using a fixed number of PLA (programmable logic array) gate delays. However, the resulting pulse width is likely to be highly variable depending on the PLA design rules. For example, smaller PLA gate geometries will reduce the gate delays. This variation could result in reset pulse widths that are too short to reset the processors. The DCA960SX's reset circuitry is also inflexible, being designed for a particular main CPU and set of I/O processors. As a result, a completely new PLA design would be required if a new I/O processor requiring a longer reset pulse were added to the controller.

Therefore, it would be desirable to provide reset circuitry for use in a dual active RAID controller to generate an internal reset pulse that reliably triggers a hard reset of the controller regardless of implementation details, such as different design rules used to implement the circuitry.

It would also be desirable to provide reset circuitry for use in a dual active RAID controller that can be easily modified to accommodate different required delay pulse widths.

It would also be desirable to provide reset circuitry for use in a dual active RAID controller that is compatible with other required reset operations, such as the generation of the common reset signal 112 and the handling of power status indicators requiring resetting of the controller.

SUMMARY OF THE INVENTION

In summary, the present invention is a system and method for implementing a hard reset operation in a RAID controller that enables the RAID controller's main CPU and on-board I/O processors to be reset.

A particular system embodiment implemented in a RAID controller configured for dual active operation generates a reset pulse with a relatively invariant pulse width that is coupled to the controller's main CPU and I/O processors. The reset pulse can be generated in response to activation of an external common reset signal. The external common reset signal is activated by an external system (e.g., another controller configured for dual active operation) whenever the controller needs to be reset. This can be when the controller fails to maintain a communication signal transmitted to the external system or when the external system has inconsistent configuration information, requiring the entire system (i.e., both the controller and the external system) to be re-initialized. The reset pulse can also be generated in response to internal reset instructions issued by the controller's main CPU. The reset instructions can be issued whenever the first controller determines that its own configuration information is inconsistent.

Yet another system embodiment adds to the above features the ability to de-activate the reset input pulse in response to activation of a signal indicating that the system has been powered down.

In yet another system embodiment the controller generates the common reset signal to cause the external system to reset itself. The controller might do this when-it the external system fails to maintain a communication signal transmitted to the controller or when the controller has inconsistent configuration information, requiring the entire system (i.e., both the controller and the external system) to be re-initialized.

In one embodiment the controller includes a counter-based state machine responsive to a start signal, a clock signal and the power down signal that is configured to output the reset pulse with the correct pulse width. The counter starts counting and activates the reset pulse whenever the start signal is asserted. The counter holds active the reset pulse until the count wraps back to its start value or until the power down signal is activated. The pulse width of the reset pulse is determined by the period of the clock signal and the number of counter bits, both of which are reliable parameters. Therefore, the pulse width is relatively free of variation. The pulse width is also easily modified by adding or subtracting bits from the counter. The start is asserted whenever the external signal is asserted or whenever there is an internal reset instruction and reset operations have not otherwise been disabled.

In yet another embodiment the controller includes a tri-state buffer circuit that is configured to output the reset signal to the external system in response to the reset instruction and/or to receive the reset signal from the external system.

In one embodiment the reset instruction is provided by a register bit that is written by the main CPU and is coupled to one input of a tri-state buffer whose output drives the common reset signal. The output of the tri-state buffer is coupled to the input of an input buffer, which is also configured to receive the reset signal. The output of the input buffer is used to generate the start signal.

In yet another embodiment the controller includes an external pulse generator responsive to a start signal and the power down signal that is configured to output the reset pulse with the correct pulse width. The external pulse generator activates the reset pulse whenever the start signal is asserted and holds the pulse active for a duration that is determined by additional external circuitry. In one embodiment the additional external circuitry includes a resistor and capacitor whose RC constant determines the pulse duration.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
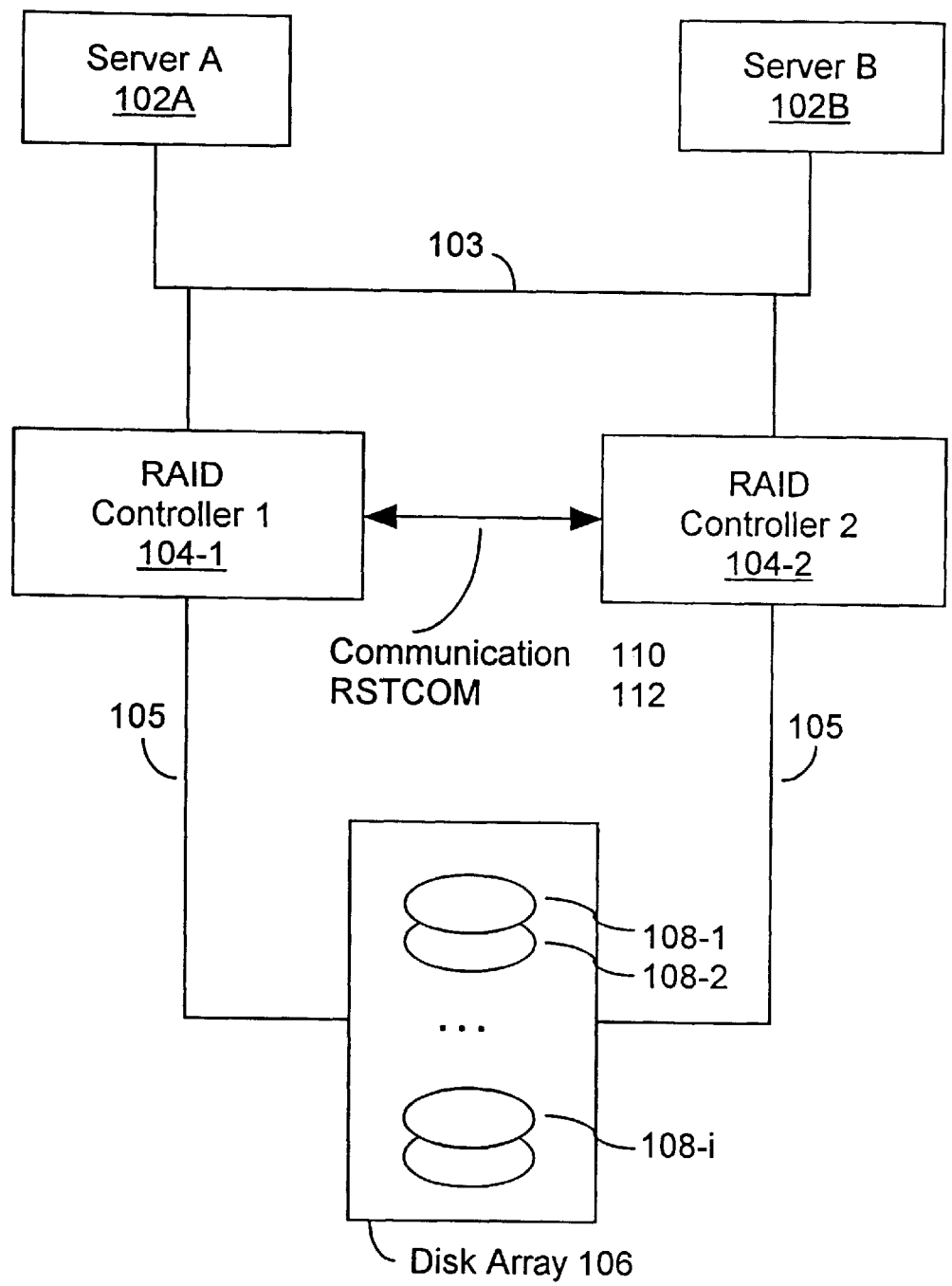
FIG. 1 is a block diagram of a dual active RAID controller system that can employ prior art reset devices and reset circuitry implemented in accordance with the present invention.
Figure 2:
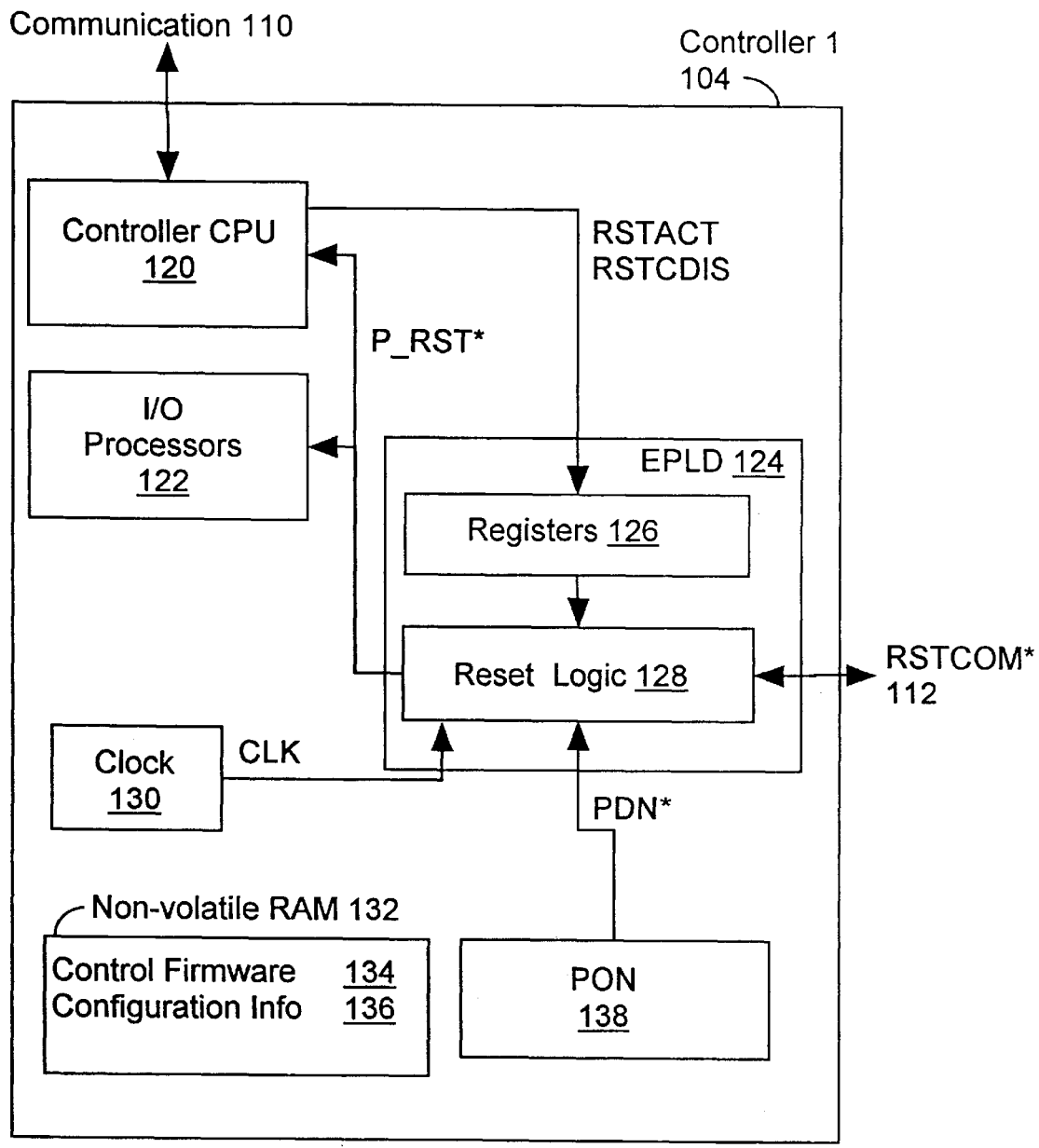
FIG. 2 is a block diagram of a controller with dual active capabilities that employs reset circuitry implemented in accordance with the present invention.

FIG. 2 shows a block diagram of a RAID controller 104 with dual active capabilities that employs reset circuitry implemented in accordance with the present invention. The controller 104 includes a main CPU 120, I/O processors 122, an erasable programmable logic device (EPLD) 124, a clock generator 130, non-volatile RAM 132 and a power on circuit (PON) 138. External signals output/received by the controller 104 include the communication and RSTCOM* signals 110, 112 (hereinafter, the asterisk "*" is used to designate an active low signal.).

The EPLD 124 includes registers 126 and reset logic 128 and is responsive to a clock signal (CLK) from the clock generator 130, a power down signal (PDN*) from the PON circuit 138, common reset activate and disable signals (RSTCACT, RSTCDIS) from theminain CPU 120, and the RSTCOM* signal. Outputs from the EPLD 124. include a reset pulse (P_RST*) coupled to the main CPU 120 and the I/O processors 122, and the RSTCOM* signal 112.

The NVRAM 132 stores control firmware 134 that can be executed by the main CPU 120 and configuration information 136 for the entire RAID system. Among other things, the control firmware 134 determines when and how the CPU 120 triggers reset operations; this aspect of the CPU's operations is described below. The configuration information 136 includes all of the configuration information needed by the controller 104 to interact with the disk array 106 and the servers 102. The content of the configuration information 136 is described in the Mylex DAC960SF manual, which is incorporated herein by reference.

The I/O processors 122 manage all communications with external devices, such as the disk array 106 and the servers 102. Each I/O processor 122 implements a particular communications protocol (e.g., SCSI, Ethernet, USB, Token Ring). The I/O processors 122 are reset whenever the reset pulse P_RST* is activated (i.e., driven low) for a sufficient time.

The main CPU 120 coordinates operation of the I/O processors 122, EPLD 124 and non-volatile RAM 132 under control of the controller firmware 134. Among other things, the CPU 120 determines at power-up whether the configuration information 136 is consistent with the configuration on disk (COD) from the disk array 106. When there is an inconsistency, the CPU 120 sets a RSTCACT bit in the registers 126 that causes the reset logic 128 to trigger a hard reset both internally (by activating the P_RST* signal), and externally (by activating the RSTCOM* signal). The duration of the P_RST* signal is determined partially by the period of the CLK signal coupled to the reset logic 128. As a consequence of the activation for a sufficient time of the reset pulse P_RST both the main CPU 120 and the I/O processors 122 are reset.

The main CPU 120 also continually monitors the status of the communication signal 110 from its companion controller 104. When the communication signal 110 is interrupted, the main CPU 120 asserts the common reset disable RSTCDIS bit in the registers 126, which prevents the assertion of the P_RST* signal and an internal hard reset, and then sets the common reset activate RSTCACT bit in the registers 126 to trigger a hard reset of the companion controller 104. The main CPU 120 then takes over the host bus ID of the companion so as to handle all host I/O.

The PON circuit 138 detects the status of the controller's power supply, which can be internal or external. At power-up and 300 ms after power-up, the PON circuit 138 activates the PDN* signal, in response to which the reset logic 128 deactivates the RSTCOM* signal if it is active. One embodiment of the reset logic is now described in reference to FIG. 3.

Figure 3:
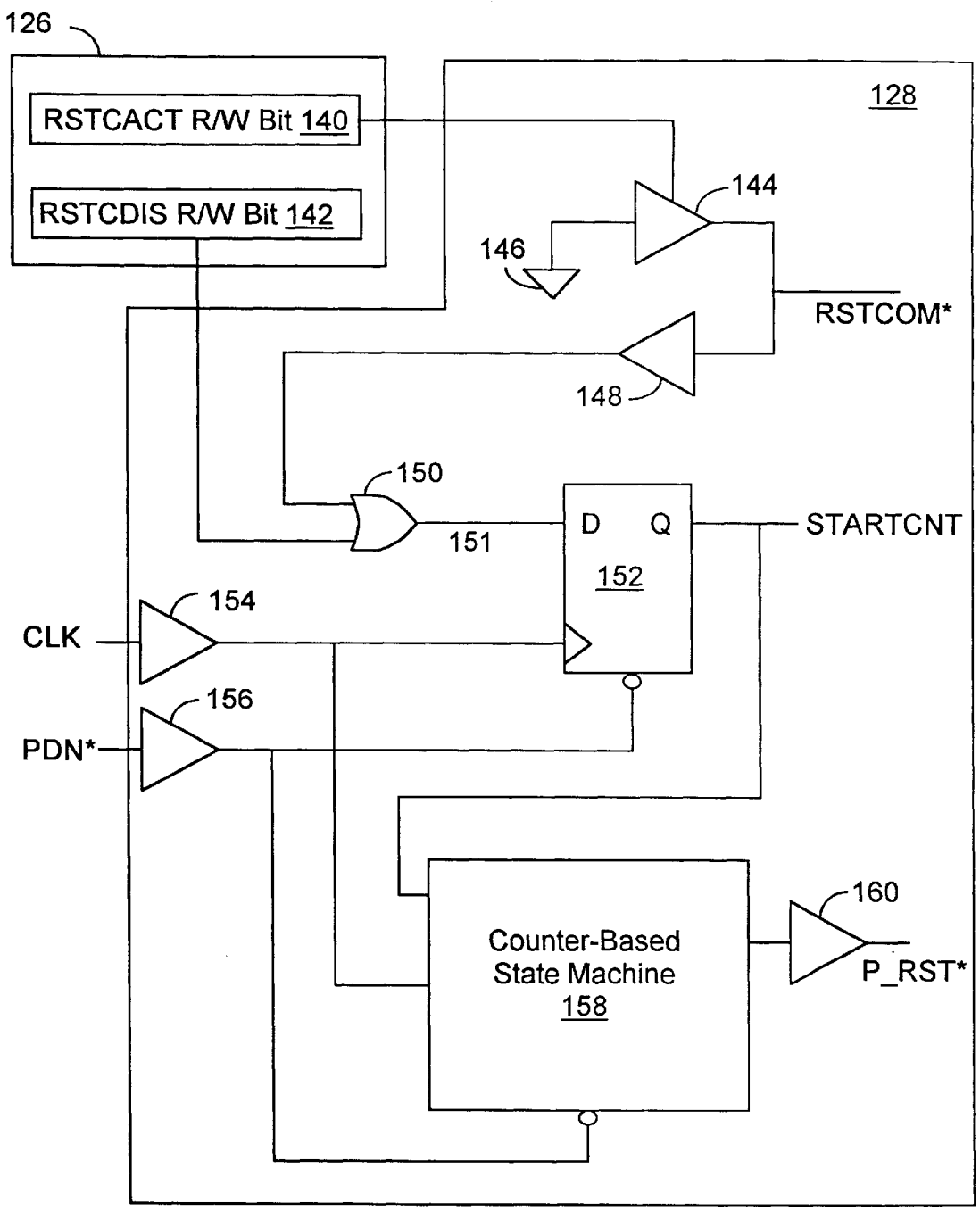
FIG. 3 is a schematic of one reset circuitry embodiment.

FIG. 3 shows a schematic of an embodiment of the reset circuitry 128 that includes three input pads/buffers 148, 154, 156, two output pads 144, 160, a ground node 146, a OR gate 150, a DQ flip-flop 152 and a counter-based state machine 158.

The output pad 144 is a tri-state buffer having a control input coupled to receive the RSTCACT bit from the registers 126, a data input tied to the ground node 146 and an output that provides the RSTCOM* signal. The input pad 148 is coupled to receive the RSTCOM* signal. The configuration of the pads 144, 148 enables the RSTCOM* signal to be both an input and an output of the reset circuitry 128 (i.e., a bi-directional signal shared with a companion controller). The input pads 154, 156 are coupled to receive the CLK and PDN* signals, respectively. The CLK input is coupled to clock inputs of the DQ flip-flop 152 and the counter-based state machine 158 and the PDN* input is coupled to the reset terminals of the DQ flip-flop and the counter-based state machine. The OR gate 150 has one input coupled to receive the RSTCOM* signal from the input pad 148 and another input coupled to receive the RSTCDIS bit 142 from the registers 126. The output of the OR gate 150 is coupled to the D input of the DQ flip-flop 152. The Q output of the DQ flip-flop 152 provides a start count signal (STARTCNT), which is coupled to a control input of the counter-based state machine 158. The counter-based state machine 158 generates the P_RST* signal, which is output to the main CPU 120 and the I/O processors 122 by the output pad 160.

The RSTCOM* signal is an active low, bi-directional, tri-state signal that is normally configured as an input and is only driven as an output upon detection of error conditions. As already mentioned, the RSTCOM* signal is controlled by the two register mapped read/write control bits RSTCDIS and RSTCACT, which are set by the firmware 134 (FIG. 2).

The RSTCDIS signal is an active high signal that can disable the effect of an incoming or self-generated active RSTCOM* signal. When the RSTCDIS signal is active the incoming RSTCOM* signal is disabled but the output RSTCOM* signal is still enabled. This mechanism prevents the controller 104 from resetting itself or from being externally reset under special circumstances.

The RSTCACT signal is an active high signal that can enable the activation of an outgoing RSTCOM* signal. At power-up, the RSTCACT signal is inactive and the RSTCOM* signal is not driven. When it is not driven the RSTCOM* signal is pulled up by a 10K Ohm external resistor. The RSTCOM* signal is driven low by the tri-state buffer 144 whenever the RSTCACT signal is active. When the RSTCACT signal is inactive the RSTCOM* is tri-stated.

In the case of a controller self-reset situation, the firmware 134 programs the RSTCDIS bit in an inactive state and the RSTCACT bit in an active state. This causes the reset logic 128 to assert the RSTCOM* signal for a predetermined number of cycles of the CLK signal. In one embodiment the active period lasts 15 cycles; other lengths are easily programmed into the state machine 158 to accommodate different warm-reset timing requirement of different CPUs 120 and I/O processors 122.

In the event of a hardware failure on one of the two controllers 104 the surviving controller firmware 134 sets the RSTCDIS bit then sets the RSTCACT bit. This causes the reset logic 128 to active the RSTCOM* signal, which enables the surviving controller 104 to hold its failed partner 104 in hard reset while taking over the failed partner's functions. This action keeps the failed controller in a reset state until some error recovery action is taken. Because the RSTCDIS bit is set prior to the RSTCACT bit the surviving controller will not reset itself.

The described functionality is provided by the interaction between the firmware 134, which sets the RSTCACT and RSTCDIS bits 140, 142 and the reset circuitry 128 shown in FIG. 3. In particular, the RSTCOM* signal is driven low by the tri-state buffer 144 whenever the RSTCACT bit is set. When the RSTCACT bit is inactive (i.e., low), the RSTCOM* signal is tri-stated. The OR gate generates an output 151 that is low only when the RSTCOM* signal is low (active) and the RSTCDIS bit is also low (inactive). The output 151 is coupled to the DQ flip-flop, which outputs a corresponding signal STARTCNT on an edge of the clock signal CLK.

The STARTCNT, CLK and PDN signals are-coupled to the counter-based state, machine 158, which generates the P_RST* signal in response to those signals. When the STARTCNT signal goes from high to low, the state machine 158 begins counting from $2^i-1$ to 0 (where i is the number of counter bits). In one embodiment, i is 4; however, the state machine 158 is easily modified to have different numbers of counter bits i. The state machine 158 asserts (drives low) the P_RST* signal as long as it counts. Therefore, the width of the P_RST* active pulse is determined by the period of the CLK signal and the number i of counter bits. The state machine 158 clears the count and de-activates the P_RST* signal whenever the PDN* signal is activated (at power-up). The resulting P_RST* signal has a well-defined width that is independent from variations in the implementation of the reset logic circuit 128. For example, since it does not rely on gate delays, the pulse width will not vary with changes in gate geometry, fabrication variations or design rule changes. The state machine 158 is now described in reference to FIG. 4.

Figure 4:
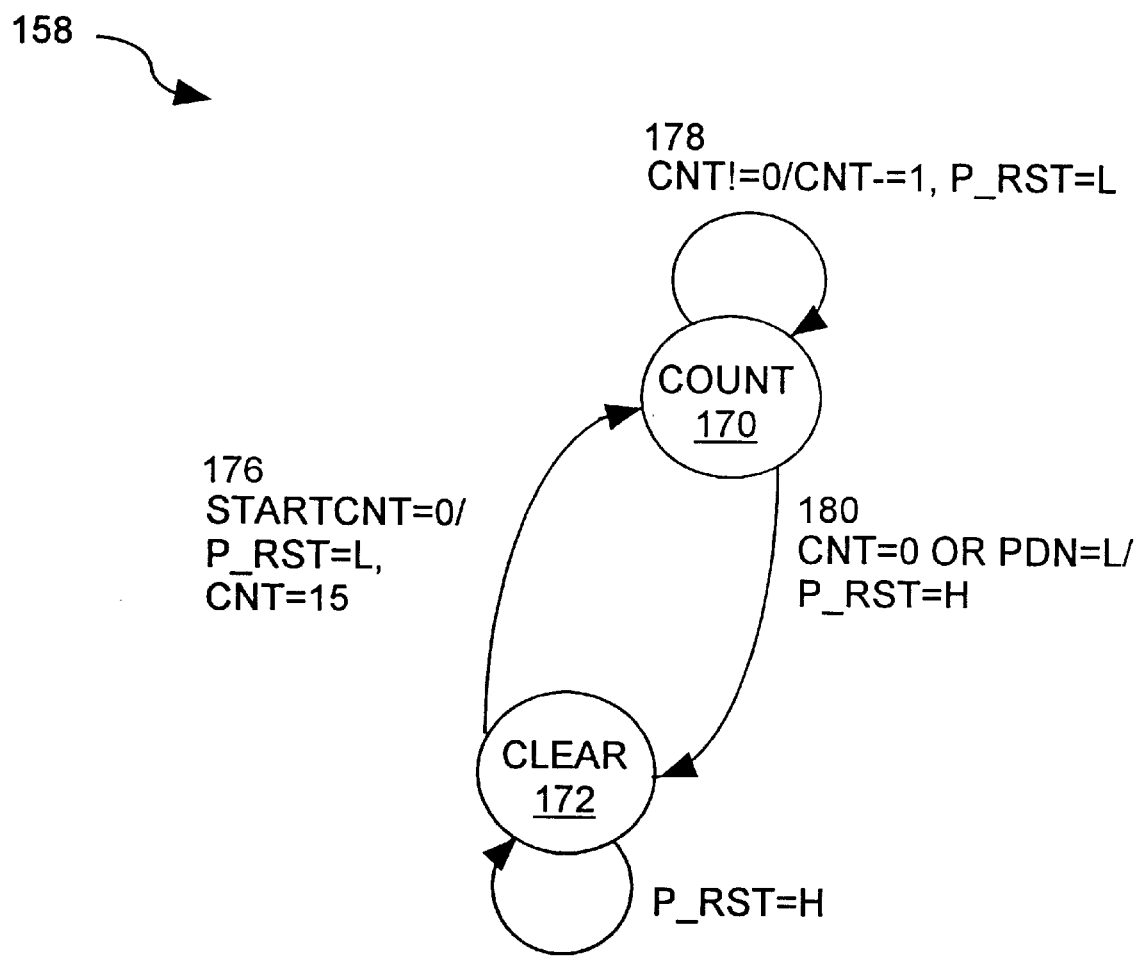
FIG. 4 is a state diagram of one embodiment of the counter-based state machine 158.

FIG. 4 shows a state diagram of one embodiment of the counter-based state machine 158. In this embodiment the state machine 158 includes two states, CLEAR 172 and COUNT 170. The default state is the CLEAR state 172, in which the state machine holds the P_RST* signal inactive (H). Upon receiving a high to low STARTCNT signal transition the state machine 158 activates (drives low) the P_RST* signal, sets an internal count CNT to 15 (assuming that the number of counter bits i=4), and makes a transition 176 to the COUNT state 170. In the COUNT state 170 the CNT is decremented at each pulse of the CLK signal and the P_RST* signal is kept active 178. A transition 180 back to the CLEAR state occurs whenever the CNT value wraps back to 0 or the PDN* signal is asserted (goes low). In an alternative embodiment the state machine 158 can count up instead of down.

More generally, the function of the counter-based state machine 158 can be implemented using any type of external pulse generator, also referred to as a time-delay generator, a one-shot or a timer. One of many alternative embodiments that uses a commercially-available external pulse generator, the National Semiconductor LM555/LM555C, is now described in reference to FIG. 5.

Figure 5:
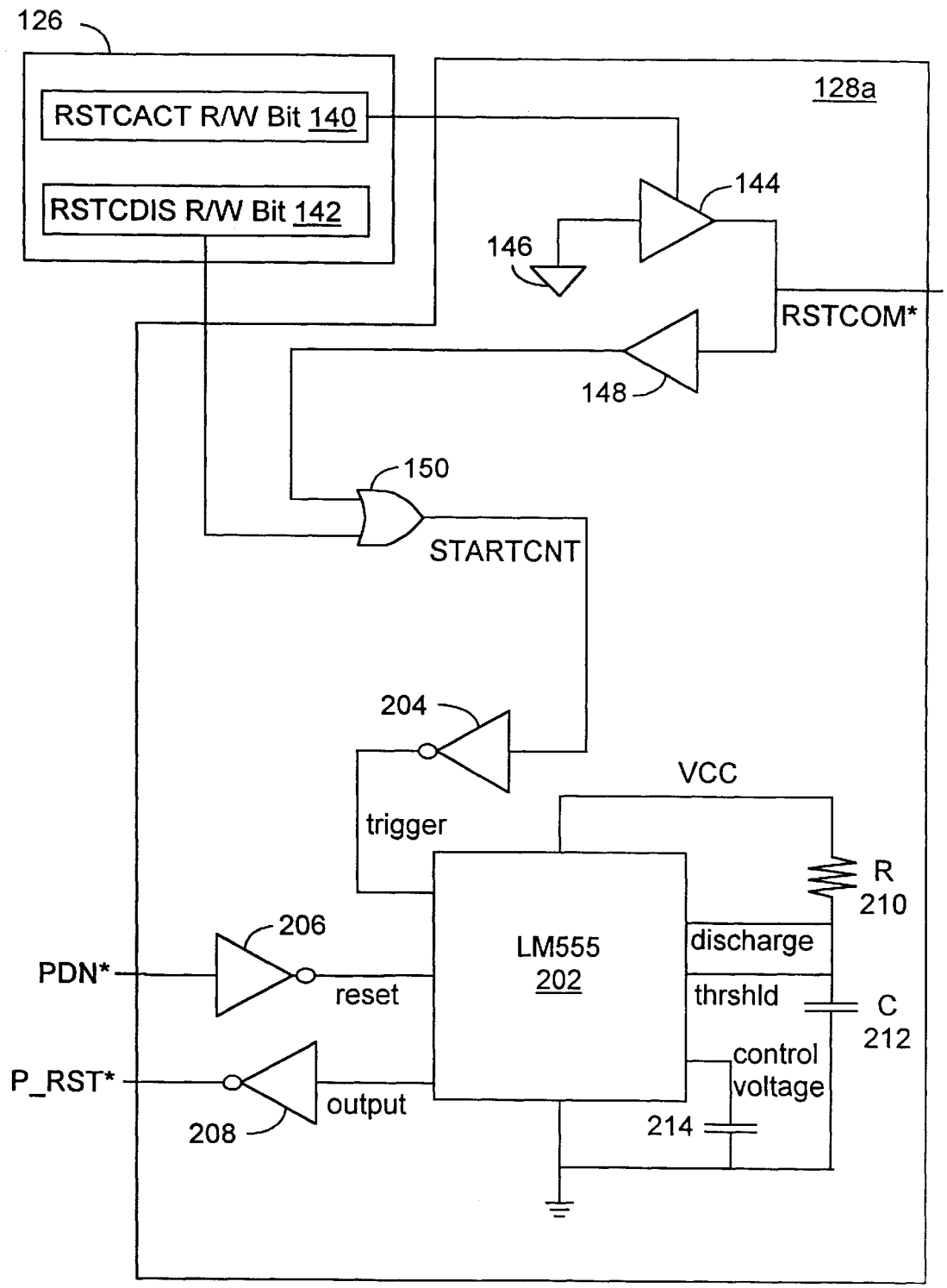
FIG. 5 is a schematic of another reset circuitry embodiment.

FIG. 5 shows a block diagram of a reset circuit embodiment 128a employing a LM555/LM555C pulse generator 202; buffers 144, 148; inverters 204, 206, 208; OR gate 150; resistor 210 and capacitors 212, 214. The signals RSTCOM*, STARTCNT, PDN*, P_RST*, RSTCACT AND RSTCDIS; buffers 144, 148 and OR gate 150 have been described in reference to FIG. 3. The labels "trigger," "reset," "output," "VCC," "discharge," "thrshld" and "control voltage" refer to inputs and outputs of the LM555/LM555C. The LM555/LM555C 202 generates a timing pulse whose beginning is triggered by a start pulse and whose duration is determined by the values R and C of the resistor 210 and the capacitor 212, respectively. Operation of the LM555/LM555C, including how to select R and C to achieve a desired pulse width, is fully described in the LM555/LM555C specification, published by National Semiconductor Corporation and incorporated herein by reference.

In the embodiment 128a the trigger pulse is the STARTCNT pulse and the R and C values are set to provide a P_RST signal with sufficient duration, as described above. Due to operating characteristics of the LM555/LM555C 202 the STARTCNT and P_RST signals are inverted before they are input and output, respectively. The LM555 202 is reset by the PDN* signal in the same manner as the state machine 158 except that, in the embodiment of FIG. 5, the PDN* signal is first inverted for compatibility with LM555/LM555C characteristics.

In contrast with the embodiment 128 of FIG. 3, the embodiment 128a does not require a CLK signal and does not include a flip-flop 152. Also, the embodiment 128a employs circuitry (e.g., a pulse generator chip) that is external to the EPLD 124 (FIG. 2).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, any state machine or other circuit that provides the functionality described in reference to FIG. 3 or FIG. 4 is within the scope of the present invention. More generally, the present invention encompasses any reset circuitry that includes the following capabilities:

1. provides a reset pulse whose pulse width is reliably set to a duration sufficient to reset a redundant controller's main CPU and any I/O processors; and
2. is programmable to support at least two modes of redundant controller dual active operation:
   Mode A where internal and external hard resets are required (i.e., where a controller resets itself and its partner);
   Mode B where only an external hard reset is required (i.e., where a controller resets only its partner).

Additionally, the present invention encompasses any reset circuitry with capabilities to:

1) easily re-program the width of the reset pulse to accommodate the warm reset requirements of additional I/O processors; and
2) allow firmware programming of the modes of operation.

The present invention has been described in reference to reset circuitry employed in a redundant, dual controller RAID system. The present invention is equally applicable to any redundant controller system where there is a need for coordinated reset operations. Such redundant controller systems are found in database, military, aerospace and communication systems.

What is claimed is:

1. A reset circuit for a dual active RAID controller, comprising:
    an input-output circuit configured to output a common reset signal that can trigger a hard reset of an external system and the RAID controller;
    a logic circuit configured to assert a start signal only when the common reset signal is asserted and an internal reset disable signal is not asserted, the reset disable signal being programmable by a main CPU in the RAID controller; and
    a pulse generator configured to assert a reset pulse with a pre-defined pulse width when the start signal is asserted, the reset pulse being coupled to reset microprocessors within the RAID controller, including the main CPU.

2. The reset circuit of claim 1, wherein the dual active RAID controller is a first dual active RAID controller and the external system is a second dual active RAID controller.

3. The reset circuit of claim 1, wherein the input/output circuit comprises:
    a tri-state buffer with a control input coupled to an internal reset activate signal, a data input coupled to a constant voltage signal, and an output that provides the common reset signal; such that, when the internal reset activate signal is asserted, the tri-state buffer drives the common reset signal to the voltage level of the constant voltage signal.

4. The reset circuit of claim 1, wherein:
    the common reset signal can be asserted by the external system; and
    the input-output circuit is further configured to receive the common reset signal from the external system.

5. The reset circuit of claim 4, wherein the input/output circuit comprises:
    a tri-state buffer with a control input coupled to an internal reset activate signal, a data input coupled to a constant voltage signal whose voltage level is the same as that of the common reset signal when asserted, and an output that provides the common reset signal; and
    a second buffer with an input coupled to the output of the tri-state buffer and an output coupled to an input of the logic circuit.

6. The reset circuit of claim 1, wherein the pulse generator comprises:
    a N-bit counter responsive to a clock signal and the start signal;
    the N-bit counter being configured to start counting upon assertion of the start signal and to stop counting upon completing $2^N$ counts;
    the N-bit counter being configured to assert the reset pulse only during the counting.

7. The reset circuit of claim 6, wherein the pulse generator is further responsive to a power down signal that, when asserted, indicates that the RAID controller has been powered up;
    the N-bit counter responding to assertion of the power down signal by clearing the N-bit counter and de-asserting the reset pulse.

8. The reset circuit of claim 6, wherein the pulse width is determined by the period of the clock signal and the number N of counter bits.

9. The reset circuit of claim 1, wherein the reset activate signal is asserted without assertion of the reset disable signal when configuration information for the RAID controller is inconsistent with configuration on disk information of an array controlled by the RAID controller.

10. The reset circuit of claim 1, wherein the reset activate signal is asserted with assertion of the reset disable signal when the external device has failed.

11. The reset circuit of claim 1, wherein the pulse generator comprises:
   a timer circuit responsive to the start signal and the RC value of an external RC circuit coupled to the timer circuit;
   the timer circuit being configured to assert the reset pulse upon assertion of the start signal and to hold the reset pulse asserted for a duration determined by the RC value, wherein the duration approximates the pre-defined pulse width.

12. The reset circuit of claim 11, wherein the timer circuit is further responsive to a power down signal that, when asserted, indicates that the RAID controller has been powered up;
   the timer circuit responding to assertion of the power down signal by clearing the timer circuit and de-asserting the reset pulse.

13. A dual active RAID controller for accessing a disk array in response to I/O requests issued by one or more host computers, the dual active RAID controller being coupled to a companion RAID controller to provide redundant access to the disk array, the dual active RAID controller comprising:
   a main CPU;
   a plurality of I/O processors;
   a non-volatile memory including firmware and configuration information; and
   a programmable logic device including a reset circuit and registers;
   the main CPU, when operating under control of the firmware, setting a reset activate bit in the registers upon determining that there is a need for a hard reset of the dual active RAID controller and the companion controller;
   the reset circuit, in response to the setting of the reset activate bit, asserting a common reset signal coupled to the companion RAID controller to trigger the companion RAID controller to reset itself and asserting an internal reset pulse coupled to the main CPU and the I/O processors to reset the main CPU and the I/O processors.

14. The dual active RAID controller of claim 13, wherein the CPU sets the reset activate bit upon determining that the configuration information stored in the non-volatile memory is inconsistent with disk configuration information stored on the disk array, causing both the dual active RAID controller and the companion controller to be reset.

15. The dual active RAID controller of claim 13, wherein the main CPU, when operating under control of the firmware, sets a reset disable bit in the registers upon determining that there is no need for a hard reset of the dual active RAID controller following subsequent setting of the reset activate bit;
   the reset circuit, in response to the setting of the reset disable bit, preventing assertion of the internal reset pulse regardless of subsequent status of the reset activate bit.

16. The dual active RAID controller of claim 15, wherein the firmware sets the activate reset bit and the disable reset bit upon determining from a communications signal provided by the companion controller that the companion controller is disabled, enabling the dual active RAID controller to take over disk operations of the disabled companion controller.

17. The dual active RAID controller of claim 13, wherein the companion controller can assert the common reset signal to cause the dual active RAID controller to reset itself.

18. The dual active RAID controller of claim 17, wherein the companion controller sets the activate reset bit upon determining from a communications signal provided by the dual active RAID controller that the dual active RAID controller is disabled.

19. The dual active RAID controller of claim 18, wherein the main CPU, when operating under control of the firmware, sets a reset disable bit in the registers upon determining that there is no need for a hard reset of the dual active RAID controller following subsequent setting of the reset activate bit;
   the reset circuit, in response to the setting of the reset disable bit, preventing assertion of the internal reset pulse regardless of subsequent status of the reset activate bit.

20. The dual active RAID controller of claim 13, wherein the reset circuit comprises:
   an input-output circuit configured to output a common reset signal that can trigger a hard reset of an external system and the RAID controller;
   a logic circuit configured to assert a start signal only when the common reset signal is asserted and an internal reset disable signal is not asserted, the reset disable signal being programmable by the RAID controller circuit; and
   a pulse generator configured to assert a reset pulse with a pre-defined pulse width when the start signal is asserted, the reset pulse being coupled to reset microprocessors within the RAID controller.

* * * * *